United States Patent [19]

Nicholson et al.

[11] 4,146,879

[45] Mar. 27, 1979

[54] VISUAL DISPLAY WITH COLUMN SEPARATORS

[75] Inventors: Larry W. Nicholson, Rochester; John L. Regehr, Stewartville, both of Minn.

[73] Assignee: International Business Machines Corporation, Armonk, N.Y.

[21] Appl. No.: 786,920

[22] Filed: Apr. 12, 1977

[51] Int. Cl.[2] .............................................. G06K 15/20

[52] U.S. Cl. ...................................... 340/734; 340/750

[58] Field of Search .................................. 340/324 AD

[56] References Cited

U.S. PATENT DOCUMENTS 3,648,272 3/1972 Schroder et al. ............ 340/324 AD 3,858,198 12/1974 Ross ............................ 340/324 AD

*Primary Examiner*—David L. Trafton

*Attorney, Agent, or Firm*—Robert W. Lahtinen

[57] ABSTRACT

The specification shows and describes a visual display of the CRT variety wherein column separator lines may be displayed intermediate character matrix positions as an operator aid. The visual column separators further do not require that any character position be used or encroached upon and where limited spacing occurs between character forming dot matrices, logic delays may be utilized in the video modify circuitry to displace the separator line and thereby visually distinguish such separator line from any adjoining character.

7 Claims, 4 Drawing Figures

VISUAL DISPLAY WITH COLUMN SEPARATORS

BACKGROUND OF THE INVENTION

This invention is directed to visual display devices and more particularly to a selectively controlled operator assist technique.

Visual display devices such as cathode ray tube (CRT) displays are enhanced by altering the display conditions of various portions of the text or data. This is commonly done by selectively underlineing, blinking, reversing the image or altering the intensity of certain portions of the display such as a character, field, row or even the entire screen. It has also been known to enclose characters or a field of characters for purposes of identity.

SUMMARY OF THE INVENTION

In the present invention, column separators are selectively provided in the form of vertical lines intermediate character positions in a row of characters. These also align from row to row to affect a partition of a single line or multiple lines as well as individual fields. With the assistance of these column separators it is possible for an operator to more readily determine the number of character spaces available in a field or that remain in a field which has been partially used. This is particularly useful when used with mandatory fields. The use of such column separators is also a valuable aid in aligning widely separated fields having no data displayed therebetween.

The column separators of this invention are formed as a single vertical line of dots intermediate character positions. Accordingly, the separators effectively identify all character positions in the field, line or screen without themselves occupying any data or character position on the screen. In a matrix data display environment where only two dot positions separate adjoining characters in a display, the use of either dot position would cause the column separator to appear as a contiguous portion of the adjoining character that extends to the full width of the character matrix at that side. That disability is overcome in the implementation of the present invention whereby the column separator dot display is delayed to displace the column separator dots from the normal position and cause the line of separator dots to be visually distinct with respect to the adjacent full width character at either lateral side.

DETAILED DESCRIPTION

Figure 1:
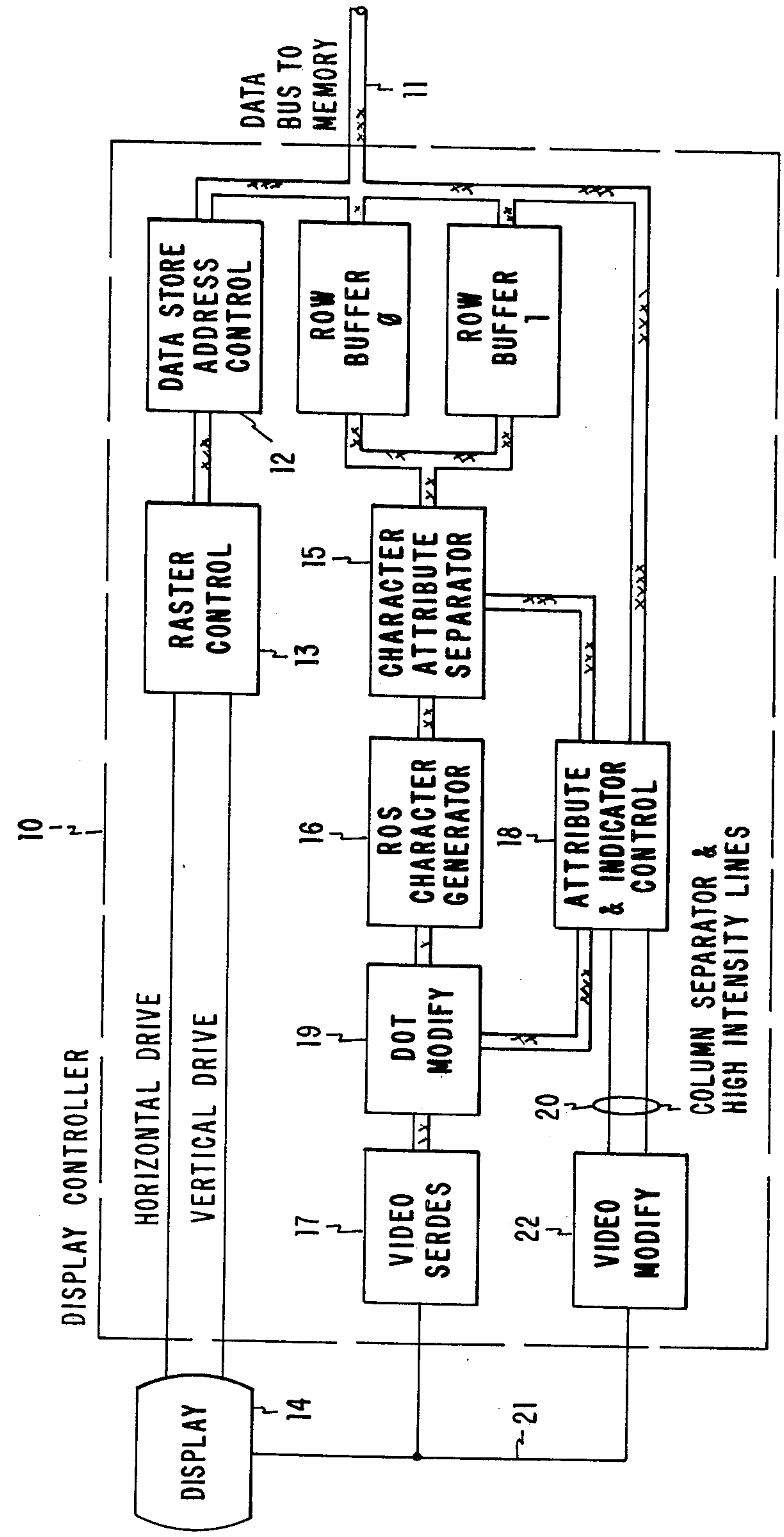
FIG. 1 shows a block diagram of a display controller for a raster scan CRT display.

FIG. 1 shows a display controller 10 wherein data, address and control information are received from a data store memory (not shown) over a common data bus 11. Controller 10 contains circuits which control the video horizontal drive and vertical drive signal lines. Data store address control 12 decodes the column and row locations of the displayable characters. With this decoded signal the raster control 13 provides the horizontal and vertical drive signals to the cathode ray tube (CRT) display 14.

Data is received from bus 11 by a pair of row buffers, row buffer 0 and row buffer 1. The row buffers are gated and loaded alternately such that one is used for odd rows and the other for even rows on the screen. While data in one row buffer is being displayed the other row buffer is being loaded or refilled for display in the next row. The row buffer currently being displayed is gated to the character attribute separator 15. A character to be displayed is gated to character generator 16 which converts the data stream into the dot pattern displayable on the screen when shifted through the video SERDES register 17.

The separator 15 gates attribute characters to the attribute indicator and control 18. Attributes control how characters will be displayed on the CRT 14. Those attribute characters which occur in the data path are routed to control 18 by separator 15 while other attribute data is received directly from data bus 11. The attribute functions, with two exceptions, are implemented by altering the signal from the character generator 16 to video SERDES 17 using circuitry in the dot modify 19. These attributes might include for example blinking, reverse image, underscore or nondisplay. Two attribute functions are effected by modifying the displayable dot pattern signal on line 21 through the use of circuitry in the video modify 22. Signals on the two lines 20 effect high intensity and the display of column separators. High intensity effects an enhanced potential of each unblanked dot signal on line 21 to affect a high level of illumination of such data and the characters which are formed thereby. This attribute control mode forms no part of the present invention and will therefore not be described in further detail. The other function is the display of column separators which cause a vertical line of dots to be displayed between each adjoining character matrix position and at row ends to separate the character positions in a data entry field (which may include either a few characters or the entire screen).

Figure 2:
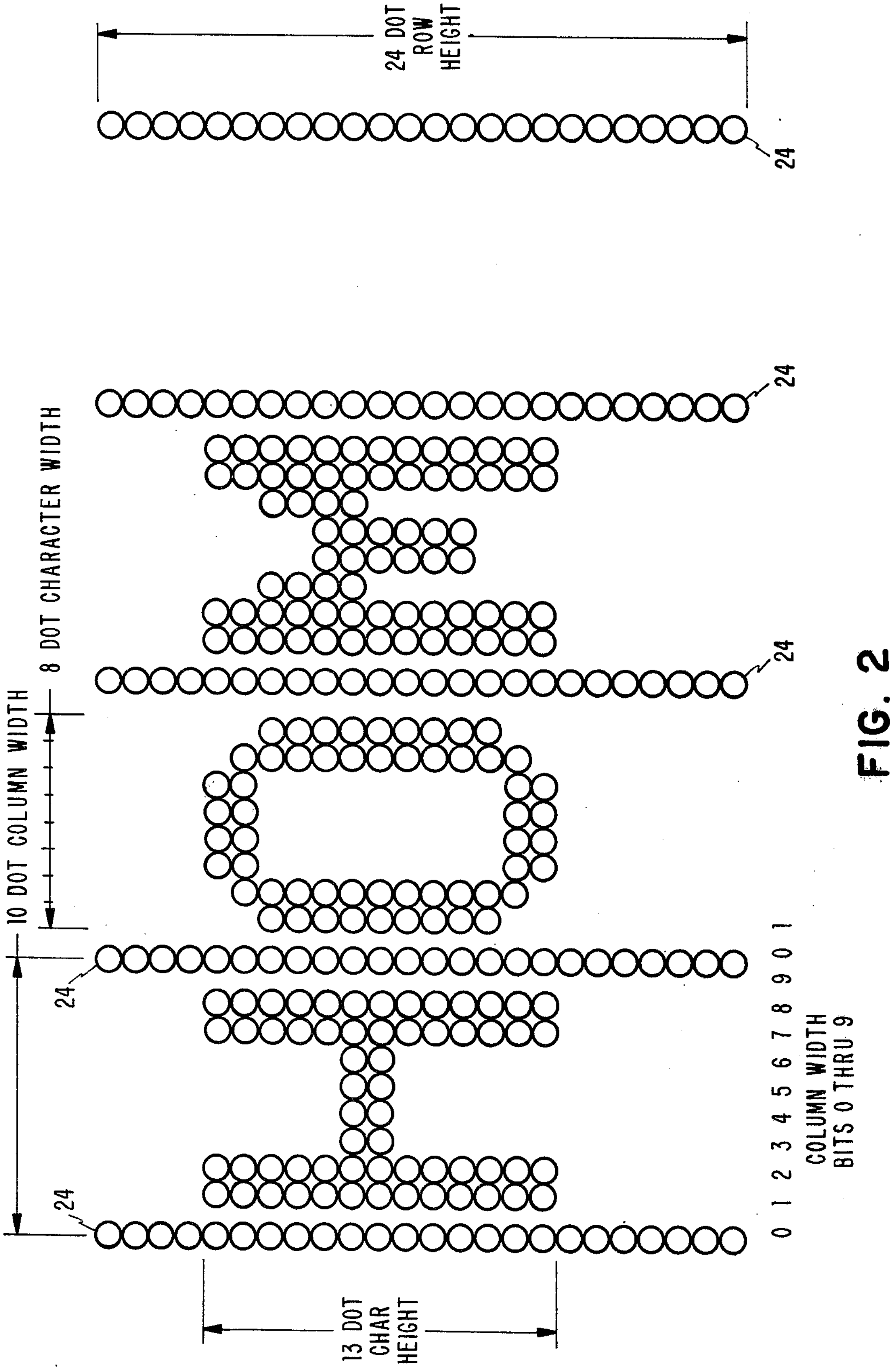
FIG. 2 illustrates a portion of a dot matrix display line or row showing column matrix, the included character matrix and the use of column separator lines with a showing of the dot positions in a horizontal raster scan of a character portion of a column position.

FIG. 2 illustrates the visual manifestation of the use of column separators on a screen in a specific environment. To simplify illustration, the unblanked or illuminated dots are shown as a series of circles. When a reverse image condition is utilized, all matrix dot positions are normally illuminated, while characters and other indicia are formed by blanking or darkening selected dots to form such indicia as darkened areas on the otherwise illuminated viewing surface. As shown the matrix includes columns 10 dots wide and rows 24 dots high. Within this $10 \times 24$ dot matrix is a character position matrix which is 8 dots wide and 13 dots high. Within each line four rows of dots are disposed above the character matrix and seven rows of dots below. As shown at the lower portion of FIG. 2 the horizontal dot positions within each column matrix are identified as 0 through 9. The two vertical columns of dots that occur between characters in each horizontal raster scan are those identified as 0 and 9 which are also referred hereafter as the character boundary. Likewise positions 1 through 8 which are the dot locations which may fall within a character matrix are at times identified hereafter as "not character boundary".

The characters used to illustrate the column position of FIG. 2 were selected because each has a substantial vertical row of dots in each of the character matrix rows 1 and 8. The column separators 24 are formed as a single row of dots in bit position 9 of each raster scan of the 24 dot row height. It might be expected that the dots of dot position 9 which form the column separators 24 would be tangent to the character dot appearing in dot position 8 and thereby coalesce with or smear into the character whereas a clearance appears between the column separator and the character immediately left thereof. This clearance is effected by the fact that although the signal to display the column separator dots during the raster scan occurs with respect to dot position 9, the several logic delays occurring in the video modify circuitry associated with the column separator signal cause the dot display to be somewhat delayed with the result that the dot is partially disposed in dot position 0. This permits the column separator to be visually separated from both adjoining characters.

Figure 3:
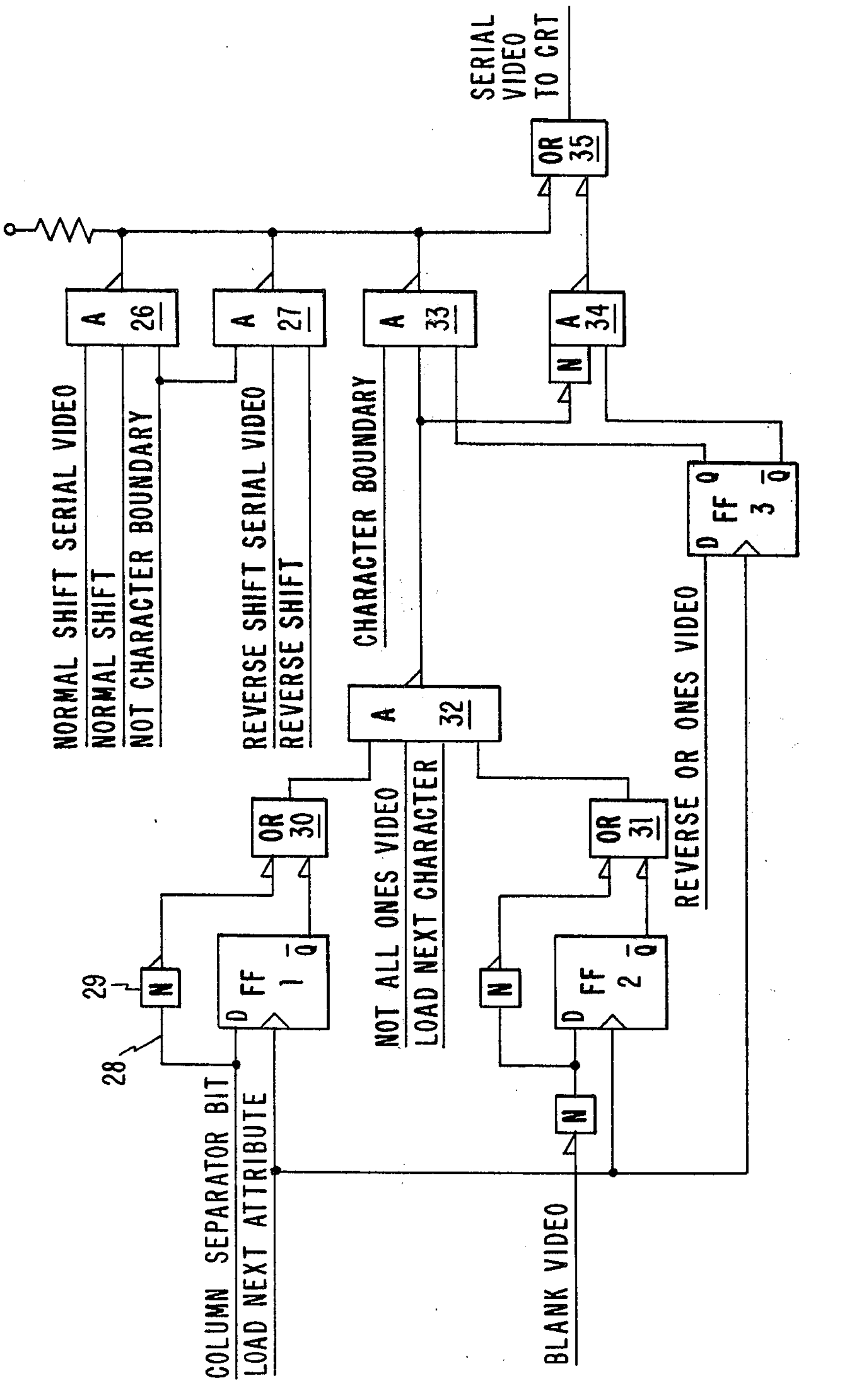
FIG. 3 is the logic diagram illustrating the circuitry for producing the column separator display of the present invention and FIG. 4 is a timing chart with respect to the video dot position of various signals of the circuit of FIG. 3.
Figure 4:
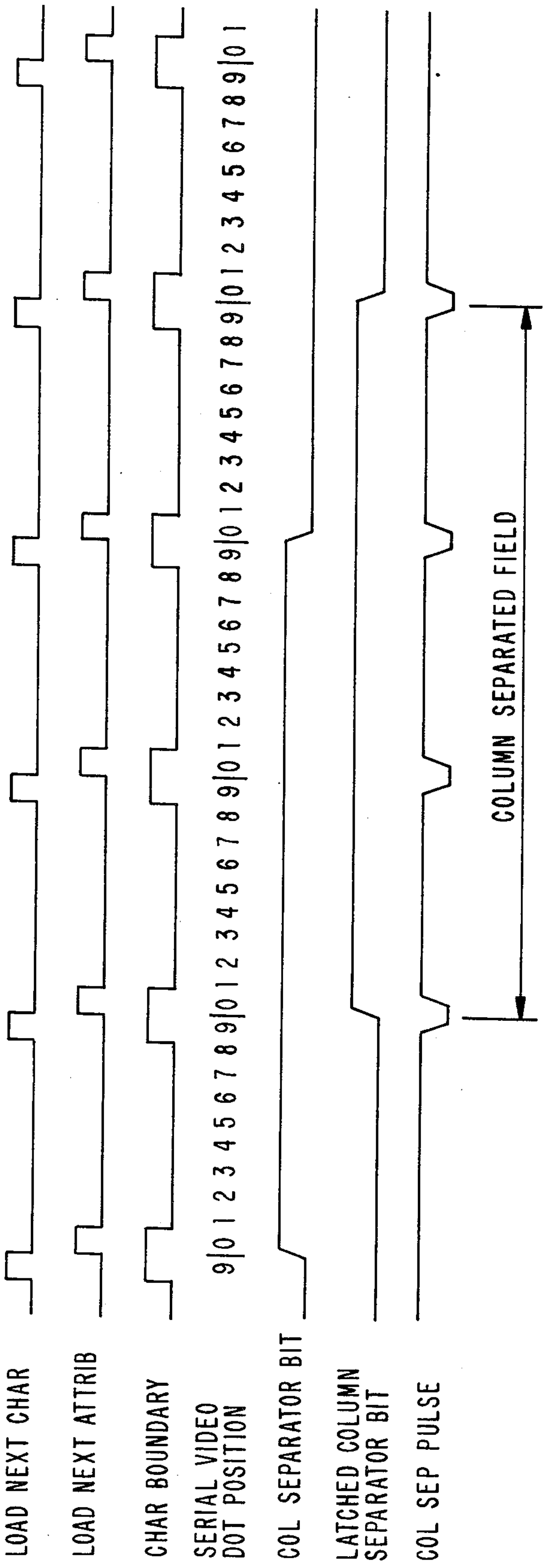

FIGS. 3 and 4 show the principal circuitry, (largely within video modify 22 of FIG. 1) which implement the column separator display along with illustrative timing diagrams. It will be noted that each of the flip flops 1, 2 and 3 being D-type flip flops are clocked the the "load next attribute" pulse occurring during dot 0 time. Further NANDs 26 and 27 are active during dot times 1 through 8 and are inactivated during character boundary or dot 9 and 0 times and therefore play no part in the column separator formation. In addition the blank video signal is considered to be down since this is active for purposes of retrace between raster scans or during traverse of screen portions which are not to receive a display. Also since normal display is being considered the reverse or ones video would be off and flip flop 3 would remain unset.

When a column separator attribute brings the column separator bit line to an up level, flip flop FF1 is set at the next dot 0 time (load next attribute). With line 28 at an up level and inverted by inverter 29 and flip flop FF1 set, negative OR 30 is satisfied. Further, with the blank video signal at a down level flip flop FF2 is also set and negative OR 31 is satisfied. Accordingly, all inputs to NAND 32 are up except the load next character signal so that this gate is made active at the next dot 9 time (load next character on) to hold the output of NAND 33 at a down level. With flip flop FF3 in a not set condition and the inverted output of NAND 32 at a down level, NAND 34 is satisfied causing both inputs to negative OR 35 to be at a down level. With negative OR 35 producing a positive or up level at dot 9 time the video circuit is turned on thereby turning the CRT beam on and producing an illuminated output. The various logic delays between dot 9 time or the load next character pulse at NAND 32 and the up or positive output of negative OR 35 produces the displacement of the column separator dot that would otherwise appear on the screen in the dot 9 position and thereby produces a visual separation between character dots in dot time 8 position and the vertical row of column separator dots.

It will also be noted that the latched condition of the column separator bit (flip flop FF1) persists one column beyond the active column separator bit signal. As is shown the column separator field includes three characters. The latched condition of flip flop FF1 enables the final column separator pulse 36 so that a vertical column separator line is displayed at each side of each character position of the field including a column separator line beyond the last character of the field.

When the data input to flip flop FF3 is positive, indicative of a reverse image display condition, the inputs to NANDs 33 and 34 therefrom is reversed causing the resulting output from negative OR 35 to be normally up and positive or down and negative during a dot 9 time that produces a column separator down output from NAND 32 to thereby generate a column separator as a darkened line of blanks at dot 9 time positions on a normally illuminated screen.

Although but one embodiment has been shown and described, it will be apparent to those skilled in the art that various changes and modifications may be made without departing from the spirit and scope of the invention.

What is claimed is:

1. A CRT display wherein dot matrix characters are displayed, in response to a data stream including data characters and attribute characters, in adjoining horizontal lines with each character position being a dot matrix parallelogram within a larger dot matrix column position parallelogram comprising, video modify means for displaying a plurality of column position matrix dots intermediate adjoining character position dot matrix parallelogram in response to a signal in the most recent prior attribute character received in the data stream, and means for displaying such a said plurality of dots between each adjoining character position dot matrix parallelogram of a predetermined continuous sequence of character positions that define a field.

2. The CRT display of claim 1 further comprising serializer-deserializer means having a serial output of data element signals to said CRT, said output of data element signals having character portions and character boundary portions intermediate said character portions, and wherein said video modify means includes alteration means for changing the blanking condition of said data element signals occurring during said character boundary portions.

3. The CRT display of claim 2 further comprising means for selectively generating a column separator attribute signal within said attribute character and said video modify means includes means for unblanking a single data element signal during each character boundary portion encountered during which a column separator attribute signal is present.

4. The CRT display of claim 1 wherein dot positions in said dot matrices are normally blanked or unilluminated and characters and said plurality of column position matrix dots intermediate character positions are formed by unblanking or illuminating selected dot locations.

5. The CRT display of claim 1 wherein dot positions in said dot matrices are normally unblanked or illuminated and characters and said plurality of column position matrix dots intermediate character positions are formed by blanking or darkening selected dot locations.

6. A CRT display wherein dot matrix characters are displayed in adjoining horizontal lines with each character position being a dot matrix parallelogram within a larger dot matrix column position parallelogram comprising:

serializer-deserializer means having a serial output of data element signals to said CRT, said output of data element signals having character portions and two dot width character boundary portions intermediate said character portions;

means for selectively generating a column separator attribute signal;

video modify means for displaying a plurality of column position matrix dots intermediate adjoining character position dot matrix parallelograms;

said video modify means altering the blanking condition of the first dot of said two dot width character boundary when said column separator attribute signal is present;

means for displaying such a said plurality of column position matrix dots between each adjoining character position dot matrix parallelogram of a predetermined continuous sequence of character positions that define a field when said column separator attribute signal is present; and logic delay means included in said video modify means for positioning dots generated by altering the blanking condition of character boundary dots, partially in the first dot position and partially in the second dot position of said character boundary, whereby the plurality of dots within a character boundary position form a vertical column separator line visually distinct with respect to dots generated by character portion data element signals adjoining said character boundary.

7. A CRT display including a cathode ray tube and a display controller for supplying serial dot data for display as dot matrix characters, such dot matrix display having a row of parallelogram column matrices with a parallelogram character position matrix disposed within each column position matrix, each character matrix being separated from the horizontally adjoining character matrix by a two dot width character boundary comprising:

signal means for selectively generating a first signal;

video modify means for selectively displaying a plurality of character boundary matrix dots intermediate adjoining characters of a continuous sequence of character positions when said first signal is present;

wheren said video modify means alters the blanking condition of the first of the two dots in the character boundary during the presence of said first signal; and wherein said video modify means further comprises logic delay means for displacing the position of said first of two dots causing said dot to be disposed partially in the position normally occupied by said first dot of the two character boundary dots and partially occupying the position normally occupied by the second dot of the two character boundary dots, whereby said row of character boundary matrix dots is visually distinct with respect to dots in either adjoining character matrix.

* * * * *